United States Patent [19]
Stewart et al.

[11] Patent Number: 5,217,186
[45] Date of Patent: Jun. 8, 1993

[54] PARACHUTE FOR SKATERS AND RUNNERS

[76] Inventors: Lloyd G. Stewart, 6408 Green Grove, Memphis, Tenn. 38141; Kirk A. Stewart, 1941 Evershott, Germantown, Tenn. 38138; Dean Lotz, 3588 Broadway, Bartlett, Tenn. 38135

[21] Appl. No.: 867,413

[22] Filed: Apr. 13, 1992

[51] Int. Cl.[5] .............................................. B64D 17/02
[52] U.S. Cl. .................................... 244/142; 280/810; 482/63; 482/74
[58] Field of Search ............... 244/113, 142, 145, 152; 280/810; 482/51, 54, 63, 74; 114/311

[56] References Cited

U.S. PATENT DOCUMENTS

| | | |
|---|---|---|
| 1,353,131 | 9/1920 | Ruff . |
| 1,387,455 | 8/1921 | Coughlin .............................. 244/142 |
| 1,406,521 | 2/1972 | Ackamann ........................... 244/142 |
| 1,485,400 | 3/1924 | Lucas ................................... 244/145 |
| 1,504,103 | 8/1924 | Davin et al. ......................... 244/142 |
| 3,459,151 | 8/1969 | Chiba .................................. 114/311 |

FOREIGN PATENT DOCUMENTS

| | | | |
|---|---|---|---|
| 344591 | 11/1921 | Fed. Rep. of Germany ...... 244/152 |
| 612313 | 10/1926 | France ................................. 244/142 |

OTHER PUBLICATIONS

Washington Times, Nov. 14, 1985, p. 2C.
Tabachnik "Parachute for Runners" Conceded Prior Art Shown in U.S. Application 07/583874, Sep. 17, 1990.

Primary Examiner—Galen Barefoot
Attorney, Agent, or Firm—Flehr, Hohbach, Test, Albritton & Herbert

[57] ABSTRACT

Parachute for providing an impedance to a or other rapidly moving person, animal or vehicle comprising a sheet having an edge or edges, peripheral cords tied to the edge or edges and distributed uniformly about the center of the sheet, such sheet being formed with a hole at its center, and a disk near the proximal ends of the cords, the peripheral cords being attached to and passing beyond the disk, the proximal ends of the cords being gathered together and fastened to the torso of a person.

3 Claims, 3 Drawing Sheets

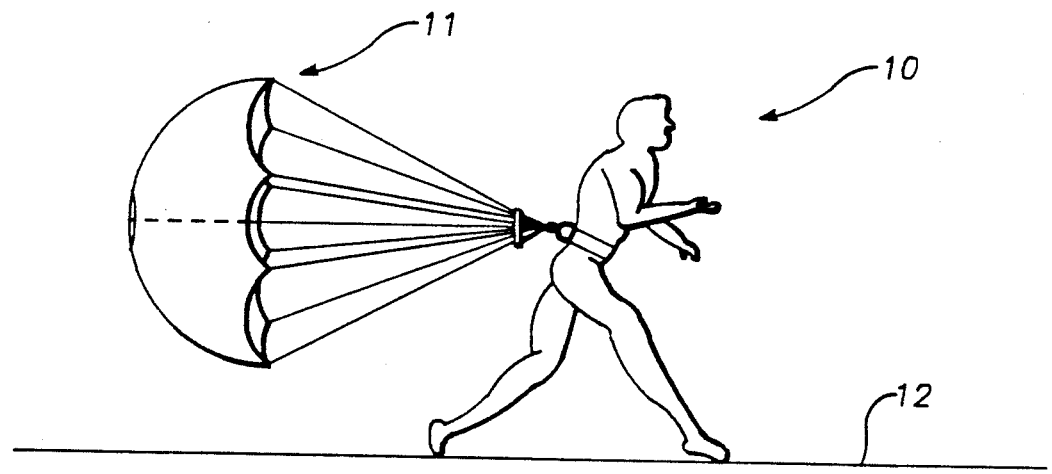
FIG.—1
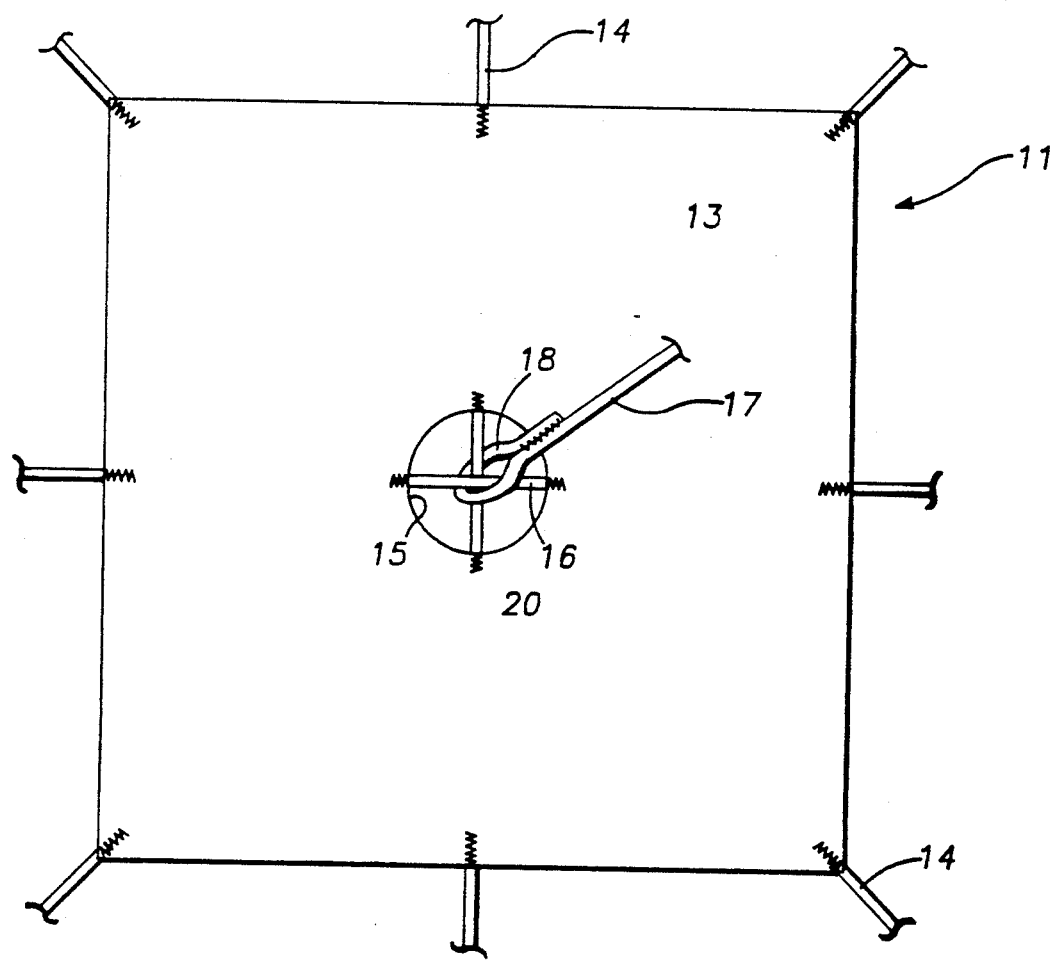
FIG.—2

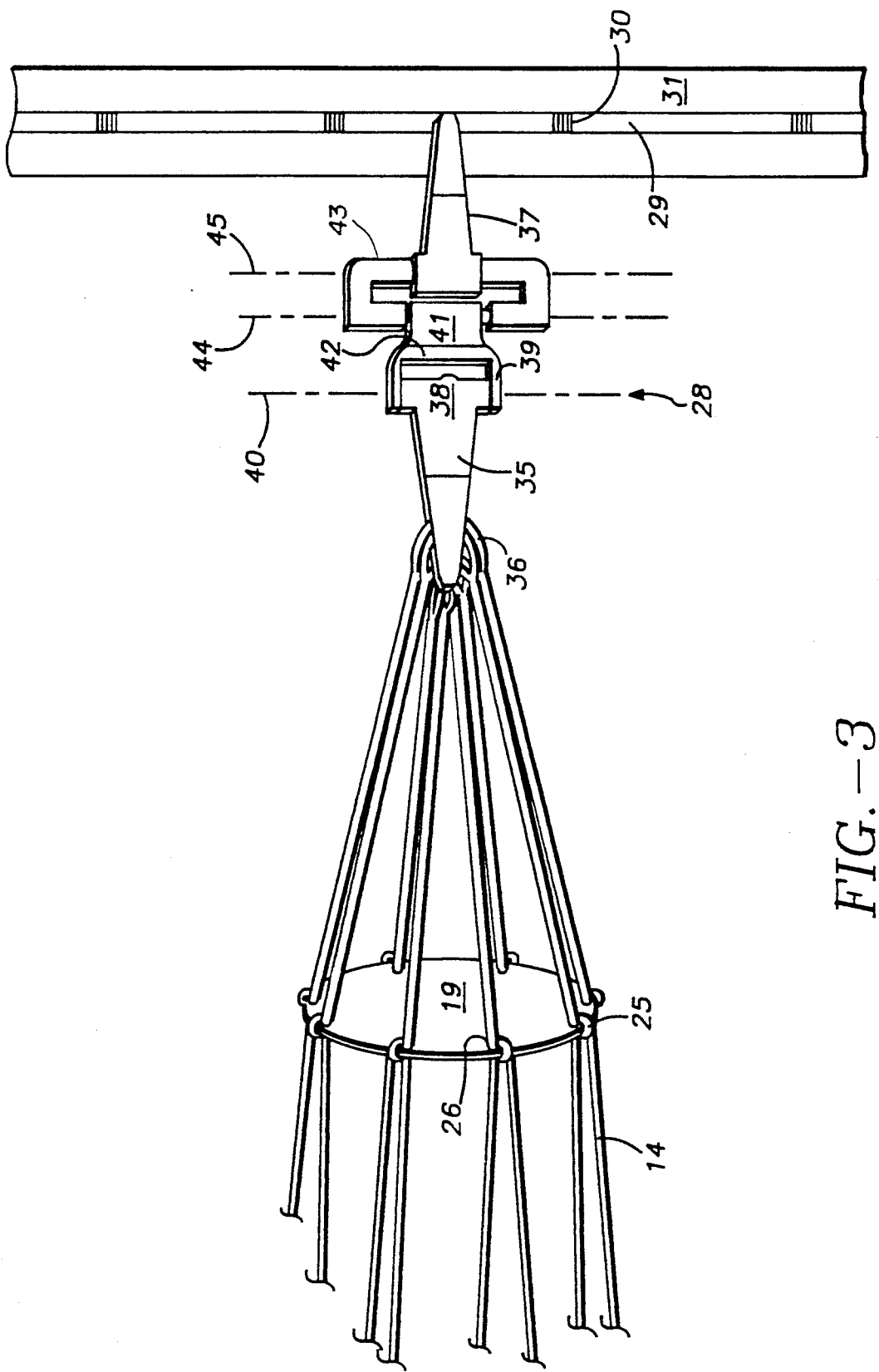

PARACHUTE FOR SKATERS AND RUNNERS

FIELD OF THE INVENTION

This invention relates to an aid in the form of a parachute for use by a runner, speed skater or the like.

BACKGROUND OF THE INVENTION

Runners frequently require for training purposes a drag or impedance which pulls against them and requires greater effort. Such may be for training purposes, to improve the runner's strength or endurance, etc. Weights may be used for this purpose but have drawbacks. The distribution or attachment of weights presents problems and they are heavy and inconvenient to transport. Other means used heretofore also have disadvantages.

OBJECTS OF THE INVENTION

It is an object of the invention to provide an improved means for exerting the desired drag or impedance on a runner, speed skater or the like.

It is a particular object of the invention to provide a lightweight, convenient, efficient and easily portable means for imparting a drag or impedance to a runner, speed skater or the like.

The above and other objects of the invention will be apparent from the ensuing description and the appended claims.

SUMMARY OF THE INVENTION

In accordance with the invention a parachute is provided with cords attached to the edges and, optionally, a cord attached to the center of the chute; the center of the chute is formed with an opening, the center cord, if used, being secured to the parachute by suitable means such as a pair of crossed cords attached at their ends to the sheet; a disk is provided at a position such that in use it is near to but spaced from the runner or skater; the several lateral cords pass through the periphery of the disk; the center cord, if used, passes through the center of the disk; and the remote ends of the cords (i.e., remote from the chute and close to the runner or skater) are gathered together and are secured to a belt worn by the runner or skater.

DESCRIPTION OF THE DRAWINGS

FIG. 1 is a side view of a runner with a parachute in open condition, raised off the ground and trailing behind the runner;

FIG. 2 is a plan view of a parachute in flat open condition;

FIG. 3 is a view on a larger scale than that of FIGS. 1 and 2 of the several cords in proximity to the runner showing how they are attached to or pass through a disk and how they are attached to the runner.

DETAILED DESCRIPTION OF THE INVENTION

Figure 4:
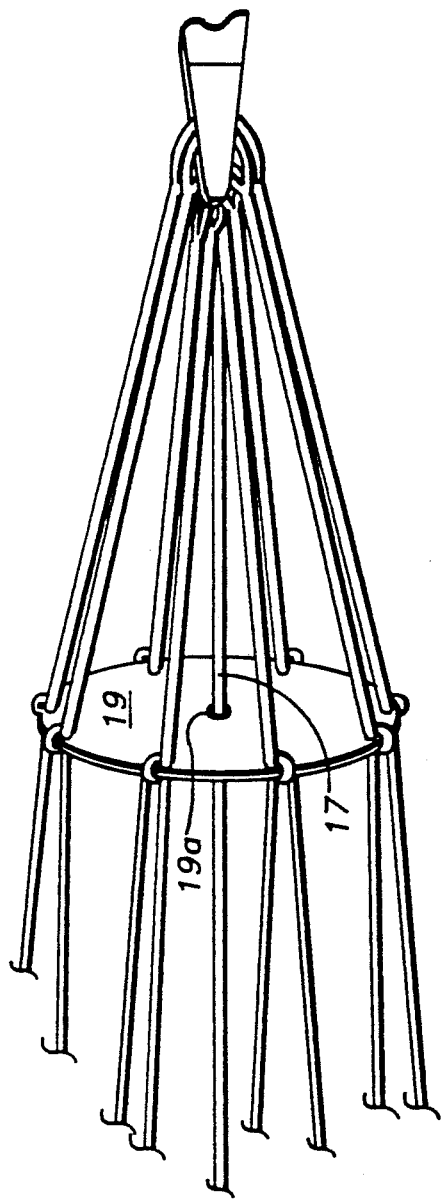
FIG. 4 is a partial view similar to that of FIG. 3 showing the use of a center cord.

Referring now to FIG. 1, a runner is shown at 10 to whom a parachute 11 is attached. The ground is indicated at 12. The person indicated at 10 may be a skater, a runner, a bicyclist or other rapidly moving person, for example an ice skater on ice, a water skier on water, a roller skater on pavement, etc. The parachute may also be used on animals such as racing dogs and race horses, also on small vehicles.

Referring to FIG. 2 as well as FIG. 1, the parachute 11 comprises a sheet 13 which is preferably rectangular, for example square or approximately square in shape and it is made of any suitable material, preferably nylon, which is light enough in weight that it will open up readily when propelled forwardly by a runner running at, for example, a speed of 20-25 miles per hour. It is also of sufficiently close weave to present a resistance to air when propelled at such a speed. The area of the sheet 13 will vary depending upon the size, weight and speed of the runner, being for example 1, 2 or 3 square meters in area. The cloth may have a hem (not shown) around its border. A nylon of rip stock such a normally used in parachutes for use in jumping from aircraft is suitable.

Attached to the border, as by sewing, for example at the corners and at the mid points of the sides, are cords 14.

A hole 15 is formed in the center of the sheet 13. This hole stabilizes the parachute in use by preventing it from swaying from side to side. This hole may be, for example, about two to six inches in diameter, and if a center cord is used, it is crossed by cords 16 which are attached, as by sewing, at their ends to the material of the sheet 13. A center cord, if used, is attached at 12, as by a loop 18, to the crossed cords 16. If the hole 15 is too large or too small it will not act properly to stabilize the parachute.

Referring now to FIG. 3, a disk 19 of suitable material, for example wood, metal or plastic, is provided at a position close to but spaced from the runner, for example about 8 to 12 inches from the runner. A preferred material for the disk 19 is Lexan, which is a polycarbonate used for bullet-proof vests. The cords 14 are attached by loops 25 and pass through holes 26 at the edge of the disk, such holes preferably being spaced equally about the disk.

FIG. 4 shows a disk 19 with a hole 19a in the center through which the center cord 17 passes.

The parachute is attached by a connector 28 to a strap 29 which is stitched at intervals at 30 to the belt 31 worn by the runner or skater. As will be seen the connector 28 is attached between a pair of stitches 30. By this means the runner or skater may adjust the point of attachment and the stitches 30 will confine shifting of the point of attachment. Also two or more parachutes may be attached at different points. On an average sized runner or skater the stitches 30 may be about two inches apart.

The connector 28 comprises a standard clip 35 onto which the cords 14 (and the center cord 17, if used) are gathered and attached by loops 36 and a standard clip 37 which clips onto the strap 29. The clip 35 has a head 38 rotatably mounted on a link 39 to swing about the axis 40. The link 39 includes a head 41 which is rotatable about an axis 42 perpendicular to the axis 40. The head 41, in turn, is mounted on a coupling 43 to swing about an axis 44. The clip 37 is rotatably mounted on the coupling 43 to swing about an axis 45.

This linkage 28 provides freedom of movement of the parachute but, together with the disk 19 (which prevents the cords 14 from becoming twisted) the parachute is kept under control.

FIG. 4 shows a center cord.

In use, the runner will attach the parachute to his torso as shown and will commence running. The chute will open and rise from the ground to the position shown in FIGS. 1 and will impose a resistance.

As stated above, the parachute of the invention may be used on human beings (runners, skaters, surfers, etc.) and preferably attached as shown in FIGS. 3 and 4, or it may be attached to animals (racing dogs, race horses, etc.) in which case the parachute or it may be attached to a collar or saddle.

It will therefore be apparent that a new and useful parachute for runners, skaters and the like has been provided.

What is claimed is:

1. An impedance device for a rapidly moving person, animal or vehicle comprising:
   (a) a sheet having an edge or edges and a center,
   (b) a plurality of peripheral cord segments each of which is attached at its distal end to an edge of the sheet, said peripheral cords being distributed about the center of the sheet such that when the proximal ends of the cord segments are gathered together and are pulled rapidly away from the sheet, the sheet will assume a parachute-like shape,
   (c) a disk,
   (d) said peripheral cord segments being attached near their proximal ends to the edge of the disk and passing through the disk, said peripheral cords being uniformly distributed about the circumference of the disk,
   (e) a center cord segment whose digital end is attached to the center of the sheet and which passes through the center of the disk,
   (f) said peripheral segments and said center cord segment being gathered together at their proximal ends, and
   (g) means fastened to said proximal ends for attachment thereof to the user of the device.

2. The device of claim 1 in which said fastening means (f) is in the form of the first clip onto which the proximal ends of the cords are gathered and secured, a second clip attachable to a belt, strap or other means encircling the user, and means connecting said first and second clips to allow swiveling motion of the device when in use.

3. The device of claim 2 in combination with a belt worn by the user and a strap secured at spaced intervals to such belt, whereby one or more devices may be fastened to the user.

* * * * *